(12) United States Patent
Enzinger

(10) Patent No.: US 11,243,049 B1
(45) Date of Patent: Feb. 8, 2022

(54) TOOL-LESS RE-ZERO OPTICAL SCOPE KNOB ADJUSTMENT SYSTEMS AND METHODS

(71) Applicant: Leupold & Stevens, Inc., Beaverton, OR (US)

(72) Inventor: Kyle Edward Enzinger, Newberg, OR (US)

(73) Assignee: LEUPOLD & STEVENS, INC., Beaverton, OR (US)

( * ) Notice: Subject to any disclaimer, the term of this patent is extended or adjusted under 35 U.S.C. 154(b) by 0 days.

(21) Appl. No.: 16/803,881

(22) Filed: Feb. 27, 2020

Related U.S. Application Data

(60) Provisional application No. 62/811,022, filed on Feb. 27, 2019.

(51) Int. Cl.
| | | |
|---|---|---|
| *F41G 1/38* | (2006.01) | |
| *G02B 23/16* | (2006.01) | |
| *G02B 27/36* | (2006.01) | |

(52) U.S. Cl.
CPC .............. *F41G 1/38* (2013.01); *G02B 23/16* (2013.01); *G02B 27/36* (2013.01)

(58) Field of Classification Search
CPC .... G02B 23/16; G02B 23/2476; G02B 26/08; G02B 26/0833; G02B 27/00; G02B 27/36; G02B 27/0056; F41G 1/38; F41G 1/42

See application file for complete search history.

(56) References Cited

U.S. PATENT DOCUMENTS

| | | | |
|---|---|---|---|
| 5,513,440 A | 5/1996 | Murg | |
| 6,279,259 B1 | 8/2001 | Otteman | |
| 8,006,429 B2 * | 8/2011 | Windauer | ................ F41G 3/06 42/122 |
| 8,490,317 B2 * | 7/2013 | Adkins | ..................... F41G 1/38 42/135 |
| 8,806,798 B2 | 8/2014 | Crispin | |
| 9,170,068 B2 | 10/2015 | Crispin | |
| 2011/0261449 A1 * | 10/2011 | Schmitt | ................. G02B 27/36 359/428 |
| 2014/0237884 A1 * | 8/2014 | Koesler | ................ G02B 23/105 42/119 |
| 2017/0226806 A1 * | 8/2017 | Nguyen | .................... E21B 4/06 |
| 2020/0326155 A1 | 10/2020 | Hamilton et al. | |

FOREIGN PATENT DOCUMENTS

WO WO-2020064762 A1 * 4/2020 ............. G02B 23/16

* cited by examiner

*Primary Examiner* — Michael D David
(74) *Attorney, Agent, or Firm* — Stoel Rives LLP

(57) ABSTRACT

Embodiments of the present disclosure relate to a user-zeroable adjustment knob for an optical aiming device. The adjustment knob includes a rotating member rotatable about an axis of rotation to change a setting of the optical aiming device, the rotating member including a rotating member clutch surface centered on the axis of rotation and a dial comprising a dial clutch surface, and wherein the dial is movable between an engaged position where the dial clutch surface is engaged with the rotating member clutch surface, and a disengaged position in which the dial clutch surface is disengaged from the rotating member clutch surface, allowing the dial to be rotated relative to the rotating member to set a zero position.

20 Claims, 6 Drawing Sheets

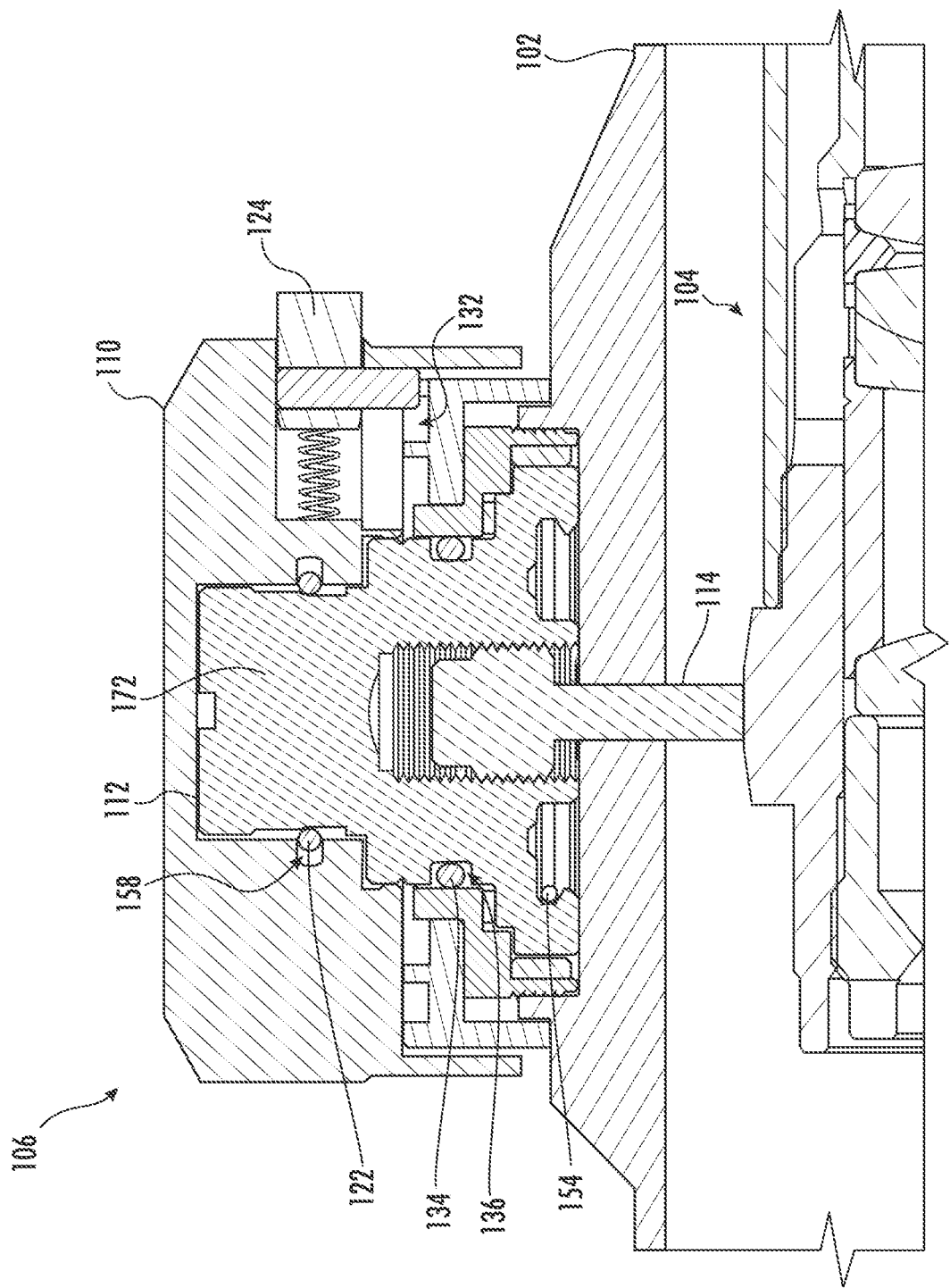

US 11,243,049 B1

TOOL-LESS RE-ZERO OPTICAL SCOPE KNOB ADJUSTMENT SYSTEMS AND METHODS

RELATED APPLICATIONS

This application claims the benefit under 35 U.S.C. § 119(e) of U.S. Provisional Patent Application No. 62/811,022, filed Feb. 27, 2019, which is incorporated by reference herein.

TECHNICAL FIELD

The present disclosure generally relates to optical devices such as rifle scopes and other optical aiming devices, and more particularly, adjustment turret knobs that can be re-zeroed without the use of tools, and to optical devices including such adjustment knobs.

BACKGROUND

An optical aiming scope for a projectile weapon such as a firearm may require adjustment when targeted on an object. For example, because a bullet may fall or otherwise have its course changed by environmental factors as it travels, the aim of the scope may be adjusted vertically and/or horizontally to compensate for such effects and increase the likelihood that an object located in crosshairs of the scope will be impacted by the bullet. Vertical adjustment of the scope's aim is known as elevation adjustment because it compensates for a bullet's elevation change (e.g., falling), and horizontal adjustment of the scope's aim is known as windage adjustment because it compensates for sideways movement of a bullet, which is often caused by wind.

The horizontal and vertical adjustment of the aim can be accomplished by manually rotating turret knobs on the scope that adjust the position of lenses or other optical elements inside the scope. An indicator scale comprising a set of markings on the outside of the knob provides a visual indication of the amount of rotation of the knob. In some adjustment knobs, the position of the indicator scale can be adjusted relative to the setting of the knob by using a hex key to loosen a grub screw coupling a dial of the knob to a rotatable threaded member inside of the knob, as is taught for example in U.S. Pat. No. 9,170,068 of Crispin, which is incorporated herein by reference. After the grub screw is loosened, the dial can be rotated to the desired position to adjust a zero setting of the knob, then the grub screw is re-tightened to fix the dial to the threaded member for co-rotation. By "zeroing" the elevation and/or windage knob in this manner, the shooter may ensure that the scope is properly calibrated (or "sighted-in") for aiming the firearm at an object at a particular distance. Sighting-in a riflescope at a known distance facilitates accurate aiming adjustments for other distances or environmental conditions, relative to the calibrated setting.

U.S. Pat. No. 6,279,259 of Otteman and U.S. Pat. No. 5,513,440 of Murg disclose riflescope adjustment mechanisms that can be re-zeroed without the use of tools. In each case, a dial portion of the adjustment mechanism is movable axially relative to inner threaded member. When the dial portion is pushed axially inward into engagement with the threaded member, the dial and threaded member rotate together to accomplish aiming adjustments. When the dial portion is pulled axially outward it can be rotated relative to the threaded member to re-set a zero setting of an indicator scale of the adjustment mechanism.

The present inventor has recognized the need for improved systems and methods for re-zeroing optical scope adjustment mechanisms.

Additional aspects and advantages will be apparent from the following detailed description of preferred embodiments, which proceeds with reference to the accompanying drawings.

BRIEF DESCRIPTION OF THE DRAWINGS

FIG. 5 is an enlarged cross-sectional view of the riflescope and adjustment knob of FIG. 1 showing the dial engaged with the rotating member.

FIG. 6A shows the elevation adjustment knob in an engaged position and the windage adjustment knob in a disengaged position, and FIG. 6B shows the opposite situation.

DETAILED DESCRIPTION OF PREFERRED EMBODIMENTS

Figure 1:
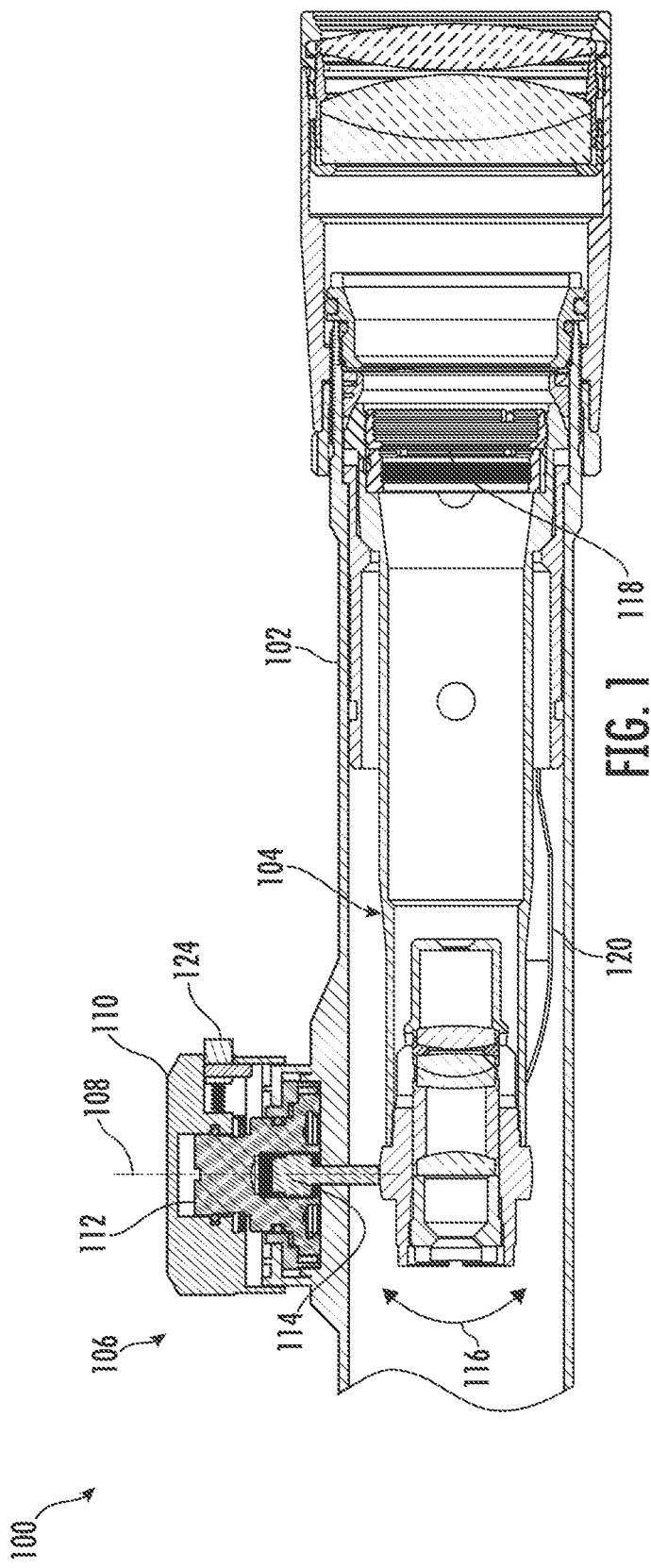
FIG. 1 is a partial cross-sectional view of a riflescope along a longitudinal axis showing an adjustment knob in a disengaged position.

FIG. 1 Illustrates a cross-sectional view of a riflescope 100 along a longitudinal axis having a housing 102 (sometimes referred to as the "maintube") and an image-inverting erector system 104 pivotably mounted within the housing 102, where erector system 104 provides an image of a point of aim. An adjustment knob 106 protrudes from housing 102 and is rotatable about an axis 108 extending transversely to a longitudinal axis of the housing 102. In some embodiments, adjustment knob 106 is press fit onto housing 102. In other embodiments, adjustment knob is threaded onto housing 102. Although a presently preferred embodiment of an optical device is described herein as riflescope 100, adjustment knobs consistent with the present disclosure may also be used with other types of optical aiming devices, such as red-dot sights, reflex sights, holographic aiming sights, iron sights, and other devices for aiming weapons and other devices, and particularly those devices for which a user may wish to adjust a zero or home position of the optical aiming device.

Figure 2:
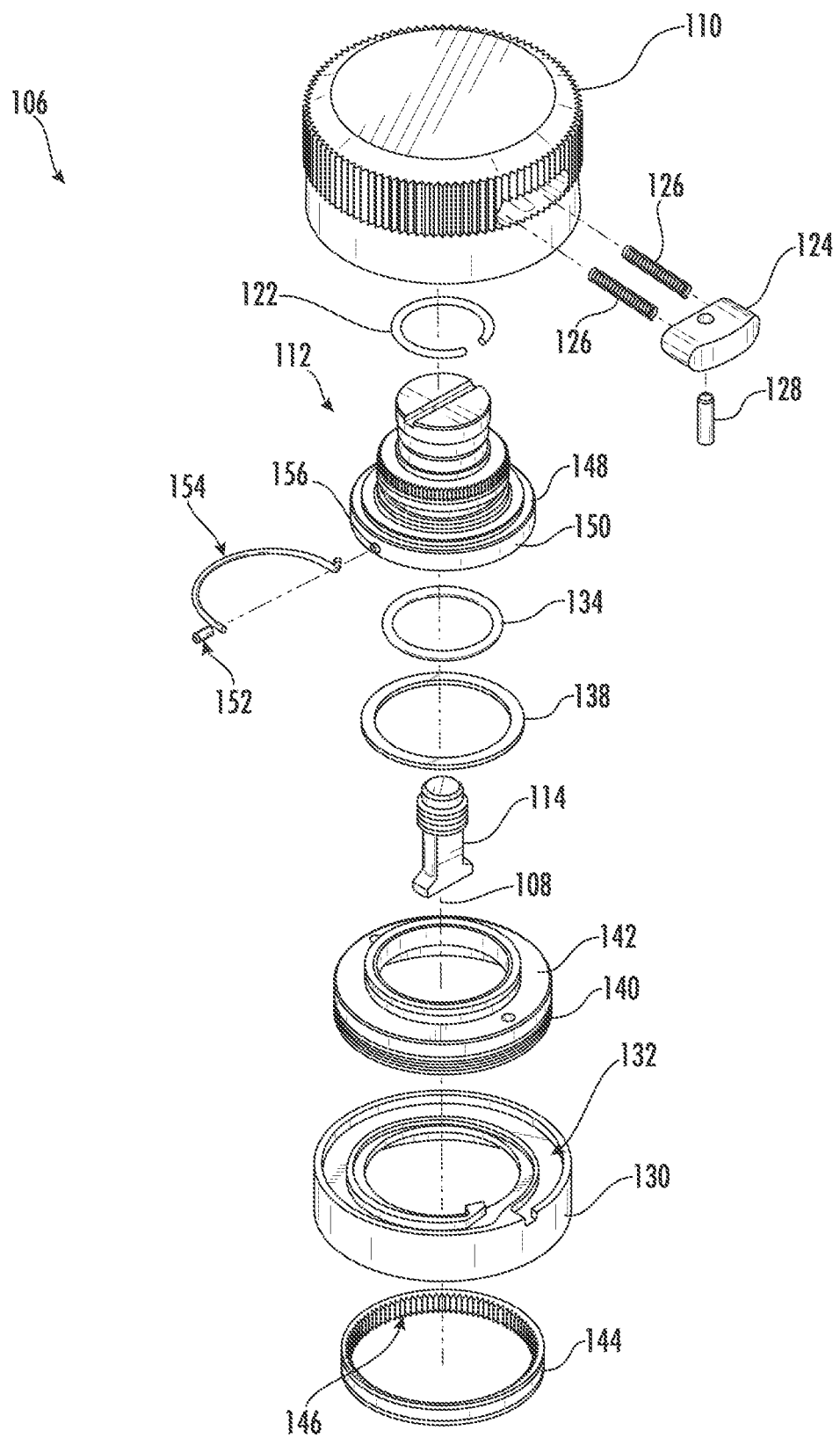
FIG. 2 is an exploded isometric view of the adjustment knob of FIG. 1.
Figure 3:
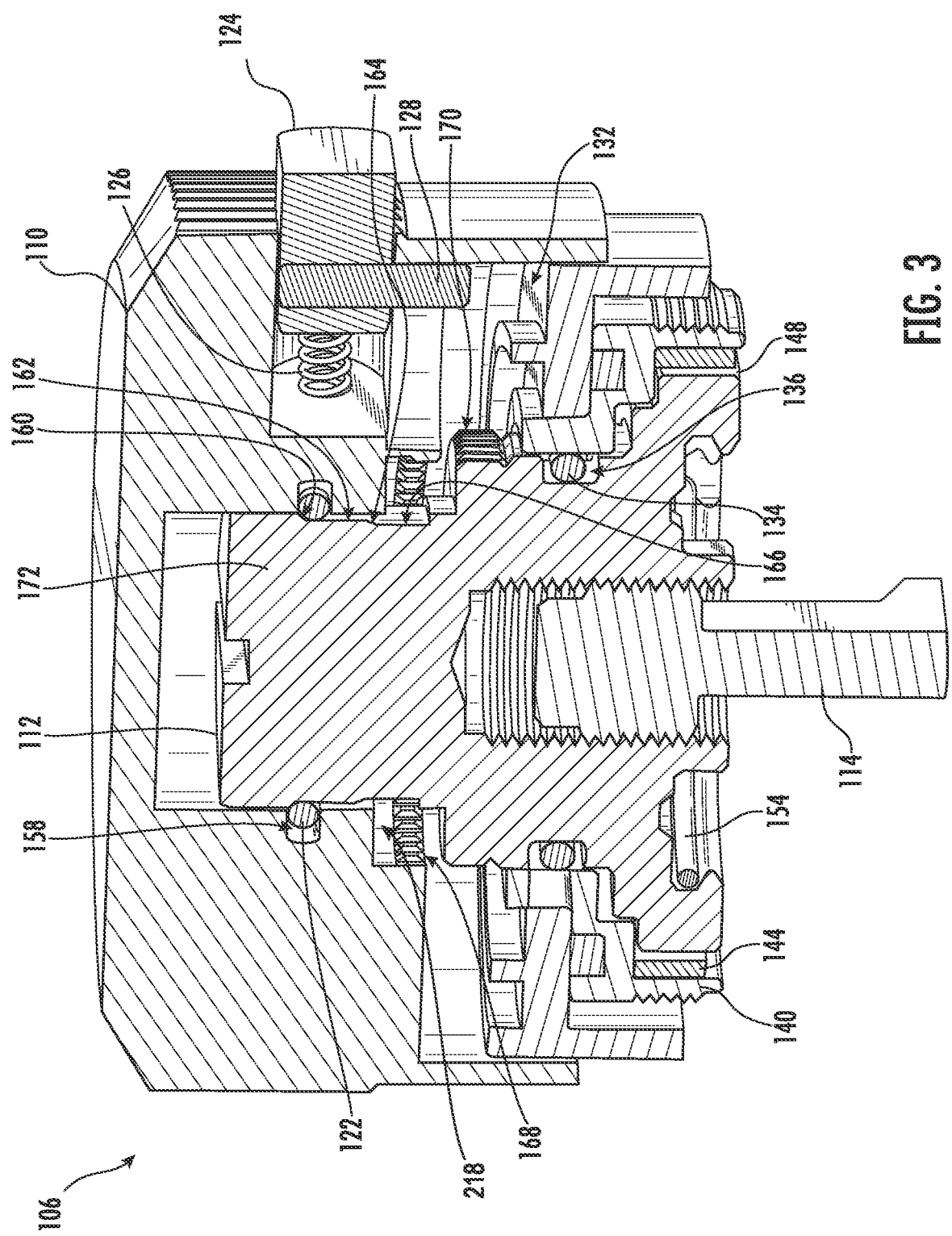
FIG. 3 is an enlarged isometric cross-sectional view of the adjustment knob of FIG. 1 showing a dial of the knob disengaged from a rotating member of the knob.

With reference to FIGS. 1-3, in the embodiment shown, adjustment knob 106 includes a dial 110 configured to engage and disengage with a rotating member 112 (which is also rotatable about axis 108). When in an engaged position (as illustrated in FIG. 5), dial 110 is engaged with rotating member 112. When in a disengaged position (as illustrated in FIG. 3), dial 110 is disengaged with rotating member 112. In some embodiments, rotating member 112 may be configured as a rotating adjustment nut or spindle that includes a hub 172. When there is engagement between dial 110 and rotating member 112, a setting of riflescope 100 can be changed. In the example illustrated, an adjustment screw (or threaded plunger) 114 is coupled (e.g., threaded) to an interior threaded cavity of the rotating member 112 and rotationally constrained in a slot in housing 102 so that rotation of dial 110 and rotating member 112 causes responsive movement of adjustment screw 114 along axis 108, and driving pivoting movement of erector system 104, illustrated by arrows 116, which effects a point of aim shift either vertically (elevation) or horizontally (windage) depending on the position of the adjustment knob 106 on the housing 102. In other embodiments (not illustrated), the rotating member 112 may be an externally threaded screw that is threaded into a threaded hole fixed on housing 102, so that the screw moves axially as it rotates to effect changes in the point of aim or other setting of riflescope 100. The shift in the point of aim of riflescope 100 is typically accomplished through cooperation between lenses or other optical elements within erector system 104 and a reticle 118 within housing 102. A spring 120 biases erector system 104 relative to housing 102 to press erector system 104 against screw 114. In FIG. 1, adjustment knob 106 is shown disengaged with rotating member 112. While FIG. 1 shows a single adjustment knob 106, it should be understood that a second adjustment knob (not visible) may be coupled to housing 102 orthogonally relative to adjustment knob 106, where adjustment knob 106 is one of an elevation adjustment knob which effects a point of aim shift vertically or a windage adjustment knob which effects a point of aim shift horizontally and the second adjustment knob is the other of the elevation adjustment knob or windage adjustment knob.

As shown in FIG. 2, adjustment knob 106 includes a retainer device 122. In some embodiments, retainer device 122 is seated in a different groove (explained with respect to FIGS. 3-5) of rotating member 112 depending on when adjustment knob 106 is in the engaged or disengaged position. In some embodiments, retainer device 122 is a spring, such as a spring snap ring, for example, and the ring may encircle rotating member 112 fully or partially.

In the embodiment shown, adjustment knob 106 further includes a depressible button 124 having springs 126 which bias against button 124 and a pin 128 movable radially relative to axis 108 when button 124 is pressed and released. In the embodiment shown, when adjustment knob 106 is in the disengaged position as illustrated in FIG. 3, pin 128 is retracted axially from a channel 132 of a guideway ring 130, but when adjustment knob 106 is in the engaged position as illustrated in FIG. 5, pin 128 is received in channel 132 and travels within channel 132 as adjustment knob 106 is rotated. Pin 128 is biased into a notch in the guideway ring 130 at a zero location of the adjustment knob 106 to lock the adjustment knob 106 at the zero location, as is described in greater detail in U.S. Pat. No. 9,170,068, which is incorporated herein by reference. In the embodiment shown, an o-ring 134 is seated within a groove 136 of rotating member 112 (shown in FIG. 3), and a washer 138 is seated within a groove 142 of threaded flange 140 (shown in FIG. 2).

In some embodiments, adjustment knob 106 includes a click mechanism to provide tactile and/or audible feedback to the user when adjustment knob 106 is rotated. For example, in the embodiment shown, a click ring 144 is interposed between a shoulder 150 of the lower base portion 148 of rotating member 112 and threaded flange 140. Click ring 144 includes a grooved surface 146 facing rotating member 112. Grooved surface 146 includes regularly spaced apart features, which, for example, include splines or a series of evenly spaced vertical grooves or ridges. Other engagement features may include a series of detents, indentations, apertures, or other suitable features. The click mechanism further includes a click pin 152 with a ramped surface configured to engage the regularly spaced apart features of grooved surface 146. Click pin 152 is housed within a bore 156 in rotating member 112 that has an open end facing grooved surface 146. A spring 154 or other biasing element urges click pin 152 to extend outwardly from within bore 156 and engage grooved surface 146. In operation, rotational movement of adjustment knob 106 about axis 108 causes click pin 152 to move out of contact with one groove and into a neighboring groove, thereby producing a click that is either audible, tactile, or both. Each click may coincide with an adjustment amount to alert the user about the extent of an adjustment being made.

FIG. 3 is an enlarged isometric cross-sectional view of adjustment knob 106 of FIG. 1, showing dial 110 disengaged with rotating member 112 (meaning that rotation of dial 110 will not cause rotation of rotating member 112 or any change to the internal optical components within housing 102). In the embodiment shown, a retainer device 122 is at least partially housed by and carried by a retainer groove 158 formed in dial 110 such that retainer device 122 is axially moveable relative to rotating member 112 with dial 110, but is not axially movable relative to dial 110. In some embodiments, retainer groove 158 is sized such that it allows free expansion of retainer device 122 within it.

Figure 4:
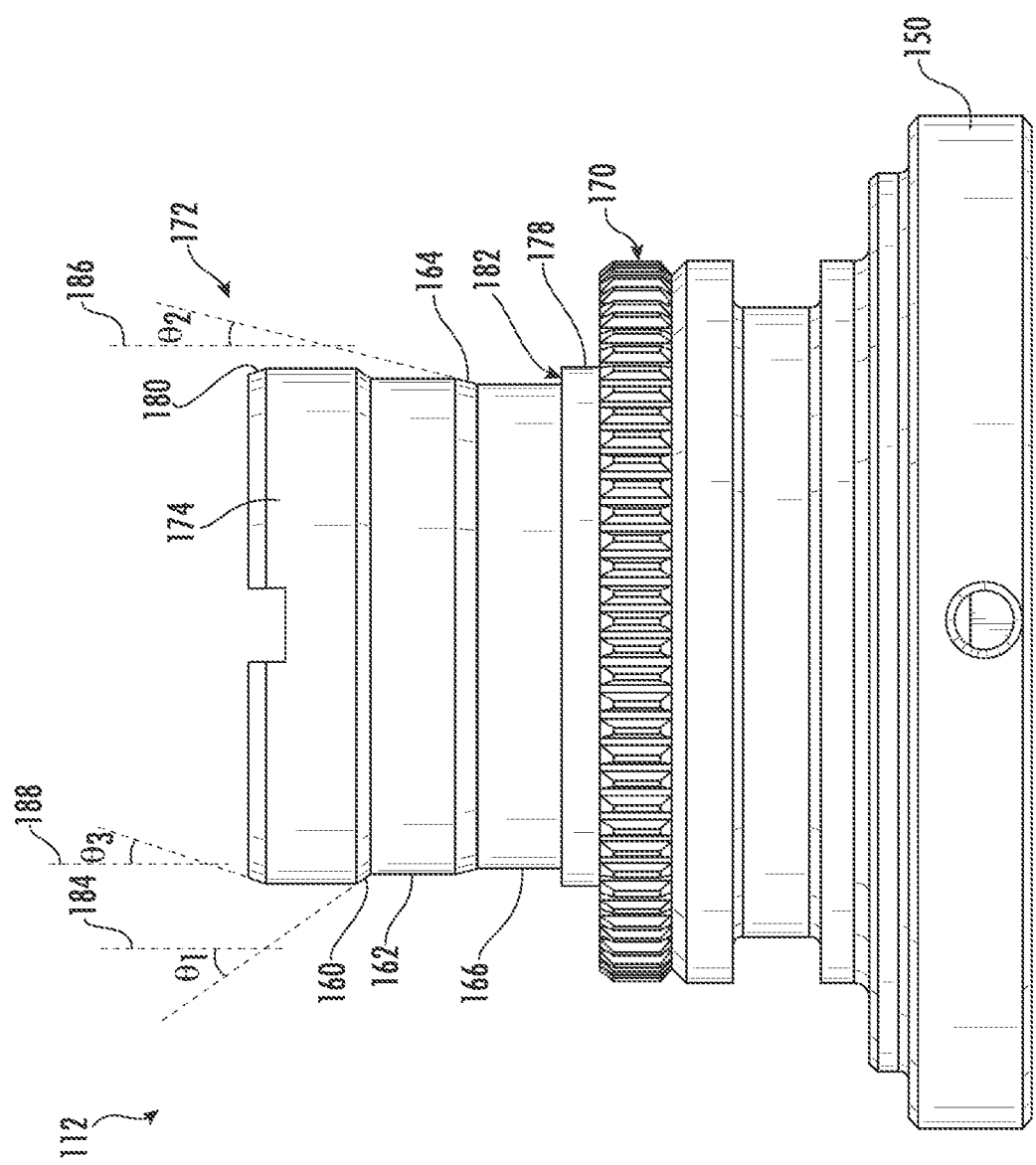
FIG. 4 is an enlarged, isolated side view of the rotating member of FIG. 3 showing details of dial retention features of the rotating member.

With reference to FIG. 3 and FIG. 4, in the embodiment shown, rotating member 112 includes a disengagement ridge 160, a disengagement groove 162, a ridge 164, and an engagement groove 166, where disengagement groove 162 and engagement groove 166 are spaced apart and ridge 164 is formed between grooves 162 and 166. In some embodiments, ridges 160 and 164 and grooves 162 and 166 are formed in hub 172 of rotating member 112. In some embodiments, disengagement groove 162 and engagement groove 166 are spaced apart on hub 172 and ridge 164 is formed between grooves 162 and 166 on hub 172. Items 160-166 are discussed further below. In other embodiments, grooves 162, 166 and ridges 160, 164 may be formed on a shaft, shank, or shoulder of an adjustment screw.

In the embodiment shown, dial 110 includes a dial clutch surface 168 and rotating member 112 includes a rotating member clutch surface 170. Dial 110 is illustrated in FIG. 3 in a disengaged position with dial clutch surface 168 moved axially outward and disengaged from rotating member clutch surface 170. In some embodiments, one of dial clutch surface 168 and rotating member clutch surface 170 may have at least one male spline, and the other of dial clutch surface 168 and rotating member clutch surface 170 may have at least one female spline. Either of dial clutch surface 168 and rotating member clutch surface 170 may have male or female splines formed thereon at the same or different pitches. In some embodiments, dial clutch surface 168 may include a plurality of splines that fully or partially encircle an interior cavity 218 of dial 110, and rotating member clutch surface 170 may include a plurality of splines that fully or partially encircle an outer surface of rotating member 112. In some embodiments, dial clutch surface 168 and rotating member clutch surface 170 have the same number of splines, while in other embodiments, dial clutch surface 168 and rotating member clutch surface 170 have a different number of splines. It should be noted that dial clutch surface 168 and rotating member clutch surface 170 need not have the same arrangement of splines. For example, one of dial clutch surface 168 and rotating member clutch surface 170 may include one or more splines arranged such that the splines fully encircle interior cavity 218 or an outer surface of rotating member 112, while the other of dial clutch surface 168 and rotating member clutch surface 170 may include only a single spline or a plurality of splines that only partially encircle interior cavity 218 or an outer surface of rotating member 112. It should be noted that dial clutch surface 168 and rotating member clutch surface 170 need not use the same type of engaging components. For example, one of dial clutch surface 168 and rotating member clutch surface 170 may include one or more splines, while the other of dial clutch surface 168 and rotating member clutch surface 170 may include one or more keys or one or more ridges. In another example (not illustrated), dial clutch surface 168 and rotating member clutch surface 170 may each have at least one tooth and form a Hirth joint when dial clutch surface 168 and rotating member clutch surface 170 are engaged.

In some embodiments, one or more splines of dial clutch surface 168 and rotating member clutch surface 170 may be used as a detent ring for the click mechanism of adjustment knob 106.

With reference to FIG. 3, in the embodiment shown, dial 110 is in a disengaged position, where retainer device 122 is seated in disengagement groove 162, abutting disengagement ridge 160, and substantially housed by retainer groove 158. It should be noted that dial 110 may also be in a disengagement position when retainer device 122 is seated in disengagement groove 162 but not abutting disengagement ridge 160.

With reference to FIGS. 3-5, in the embodiment shown, dial 110 is moveable to an engaged position by pushing dial 110 toward housing 102 (FIGS. 1 and 5) such that retainer device 122 moves over ridge 164 to engagement groove 166 and dial 110 is in an engaged position having dial clutch surface 168 and rotating member clutch surface 170 engaged with each other. FIG. 5 is an enlarged cross-sectional view of adjustment knob 106 showing dial 110 in the engaged position. In the engaged position, rotation of dial 110 will rotate rotating member 112 and change a setting of riflescope 100, e.g., by moving erector system 104 within housing 102.

In some embodiments, when retainer device 122 is seated in the disengagement groove 162, retainer device 122 is substantially housed by retainer groove 158. For example, substantially housed means that about 50% or more of a diameter of retainer device 122 is received in retainer groove 158. In some embodiments, when retainer device 122 is seated in the engagement groove 166, retainer device 122 is only partially housed by retainer groove 158. For example, partially housed means that less than about 50% of a diameter of retainer device 122 is housed by retainer groove 158. It should be noted that in some embodiments, retainer device 122 may be partially housed or substantially housed by retainer groove 158 when it is seated in one or both of disengagement groove 162 or engagement groove 166.

In some embodiments, when dial 110 is moved from a disengaged position to an engaged position (and vice versa), retainer device 122 is moved between disengagement groove 162 and engagement groove 166 and rides over a ridge 164 when moving between grooves 162 and 166. In some embodiments, when retainer device 122 moves or rides over ridge 164 when traveling from engagement groove 166 to disengagement groove 162, retainer device 122 expands into retainer groove 158 such that a greater portion of retainer device 122 is housed by retainer groove 158 when retainer device 122 is seated in the disengagement groove 162 relative to when retainer device 122 is seated in the engagement groove 166. In some embodiments, when retainer device 122 moves or rides over ridge 164 when traveling from disengagement groove 162 to engagement groove 166, retainer device 122 collapses out of retainer groove 158 such that a smaller portion of retainer device 122 is housed by retainer groove 158 when retainer device 122 is seated in the engagement groove 166 relative to when retainer device 122 is seated in the disengagement groove 162.

Retainer device 122 can be configured such that it limits or reduces total travel from the engaged position to the disengaged position (and vice-versa). For example, retainer device 122 can apply constant or substantially constant friction to rotating member 112 such that free movement of retainer device 122 is limited or reduced. In some embodiments, the snap ring or other spring of retainer device 122 may be sized and selected to cooperate with ridge 164 for requiring a minimum pull force to move dial 110 from the engaged position to the disengaged position. The minimum pull force can be a value in the range from about 1 lb. to about 10 lbs, or between about 2 lbs. and 10 lbs. Disengagement ridge 160 is preferably sized larger than engagement ridge 164 to require a pull force preferably exceeding 10 lbs., or exceeding 14 lbs., to remove dial 110 from rotating member 112. In some embodiments, the push force required for moving dial 110 from the disengaged position to the engaged position is about 2 lbs. or less or less than about 1 lb.

It should be noted that while FIGS. 1-5 illustrate embodiments where disengagement groove 162 and engagement groove 166 are formed on rotating member 112 and retainer groove 158 is formed on dial 110, embodiments having other configurations are encompassed by this disclosure. For example, in some embodiments, dial 110 may have a plug configured to insert into a receiving cavity formed in hub 172 of rotating member 112, and the plug may have a disengagement groove and an engagement groove formed thereon substantially similar to grooves 162 and 166. In some embodiments, the receiving cavity of hub 172 may have a retainer groove formed therein substantially similar to retainer groove 158. In such embodiments, retainer device 122 may partially or fully encircle the plug. In such embodiments, retainer device 122 is at least partially housed by and carried by the retainer groove of the receiving cavity such that retainer device 122 is axially moveable relative to dial 110 but not axially movable relative to rotating member 112.

FIG. 4 is an enlarged, isolated view of rotating member 112 of adjustment knob 106. As illustrated in FIG. 4 and discussed above, in some embodiments, rotating member 112 includes disengagement ridge 160, disengagement groove 162, ridge 164, and engagement groove 166 formed in a hub 172 of rotating member 112. In some embodiments, hub 172 also includes a top rib 174 and a bottom rib 178. Engagement groove 166 can also be referred to as a first circumferential step, disengagement groove 162 can also be referred to as a second circumferential step, top rib 174 can also be referred to as a third circumferential step, and bottom rib 178 can also be referred to as a fourth circumferential step. For example, the first circumferential step may be formed by a first circumference of rotating member 112 and the second circumferential step may be formed by a second circumference of rotating member 112, wherein the first circumference is less than the second circumference. For example, the third circumferential step may be formed by a third circumference of rotating member 112 and the fourth circumferential step may be formed by a fourth circumference of rotating member 112, wherein the third circumference is greater than the second circumference, and the third circumference is less than the fourth circumference. For example, the third circumference and fourth circumference may be equal. Moreover, in some embodiments, disengagement groove 162 is formed by a first diameter of rotating member 112 and the engagement groove 166 is formed by a second diameter of rotating member 112, where the first diameter is larger than the second diameter.

Disengagement ridge 160 and ridge 164 can also each be referred to as a chamfer, for example. For example, a top ridge 180 may be formed on top rib 174, and may also be referred to as a chamfer. In some embodiments, one or more of ridges 160, 164, and 180 are sloped or inclined.

In the embodiment shown in FIG. 4, ridge 160 forms a retention angle Θ1 with a vertical axis 184 around rotating member 112 which is parallel to axis 108 (FIG. 1). In some embodiments, angle Θ1 is about 45 degrees. In some embodiments, angle Θ1 can range from about 30 degrees to about 60 degrees. In the embodiment shown, ridge 164 forms a retention angle Θ2 with a vertical axis 186 around rotating member 112 which is parallel to axis 108 (FIG. 1). In some embodiments, angle Θ2 is about 17 degrees. In some embodiments, angle Θ2 can range from about 10 degrees to about 30 degrees. In some embodiments, top ridge 180 also forms an angle Θ3 with a vertical axis 188 around rotating member 112. In some embodiments, angle Θ3 is about 30 degrees. In some embodiments, angle Θ3 can range from about 10 degrees to about 45 degrees. In some embodiments, angle Θ3 is selected such that installation of retainer device 122 on rotating member 112 will limit or avoid or reduce damage on hub 172 and/or retainer device 122 from incidence with a surface of rotating member 112, such as a surface of top rib 174 (which may have the largest diameter of hub 172 that retainer device 122 rides over).

In some embodiments, a distance between ridge 160 and ridge 164, forming a length of disengagement groove 162, is about 0.09 inches. In some embodiments, a distance between ridge 164 and a lip 182 of bottom rib 178, forming a length of engagement groove 166 is about 0.08 inches. In some embodiments, a distance between ridge 160 and top ridge 180, forming a length of top rib 174, is about 0.09 inches. In some embodiments, the length of disengagement groove 162 and engagement groove 166 is selected such that there is enough clearance for pin 128 of button 124 (shown in FIG. 3) to extend into and retract out of a channel 132. In some embodiments, the ratio of lengths between all or a subset of disengagement groove 162, engagement groove 166, and top rib 174 is selected to reduce or limit the overall assembled height of adjustment knob 106 and/or reduce or limit the freedom of movement of adjustment knob 106 to improve ergonomics of engagement and/or disengagement.

Figure 6A:
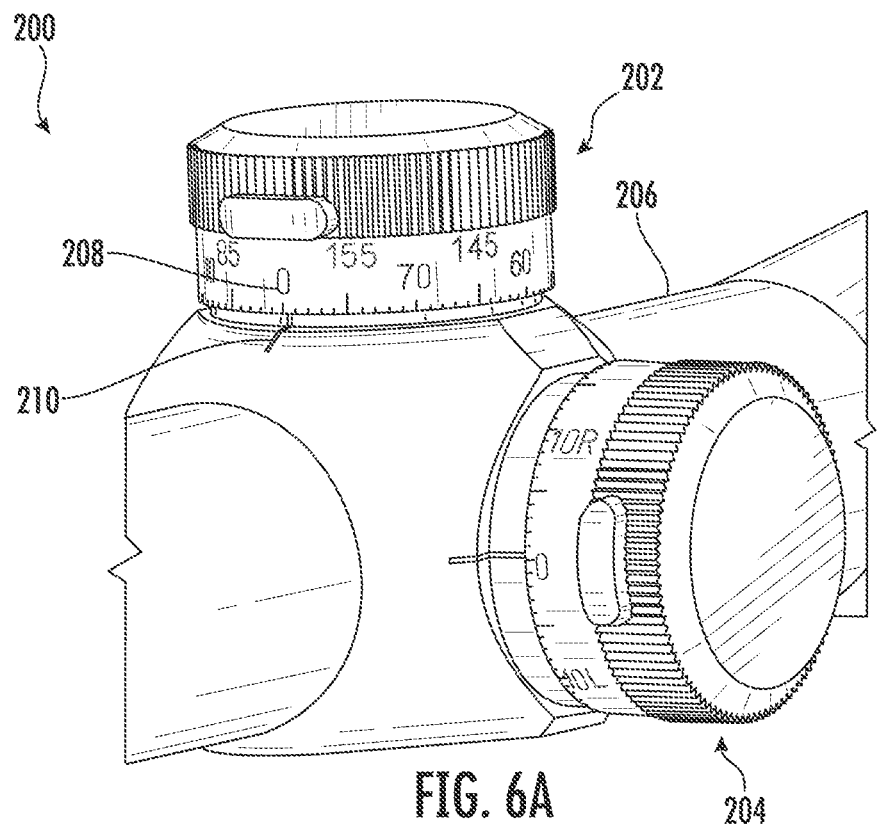
FIGS. 6A and 6B show exterior isometric views of a riflescope having the adjustment knob of FIG. 1 used as an elevation adjustment knob and a windage adjustment knob, where
Figure 6B:
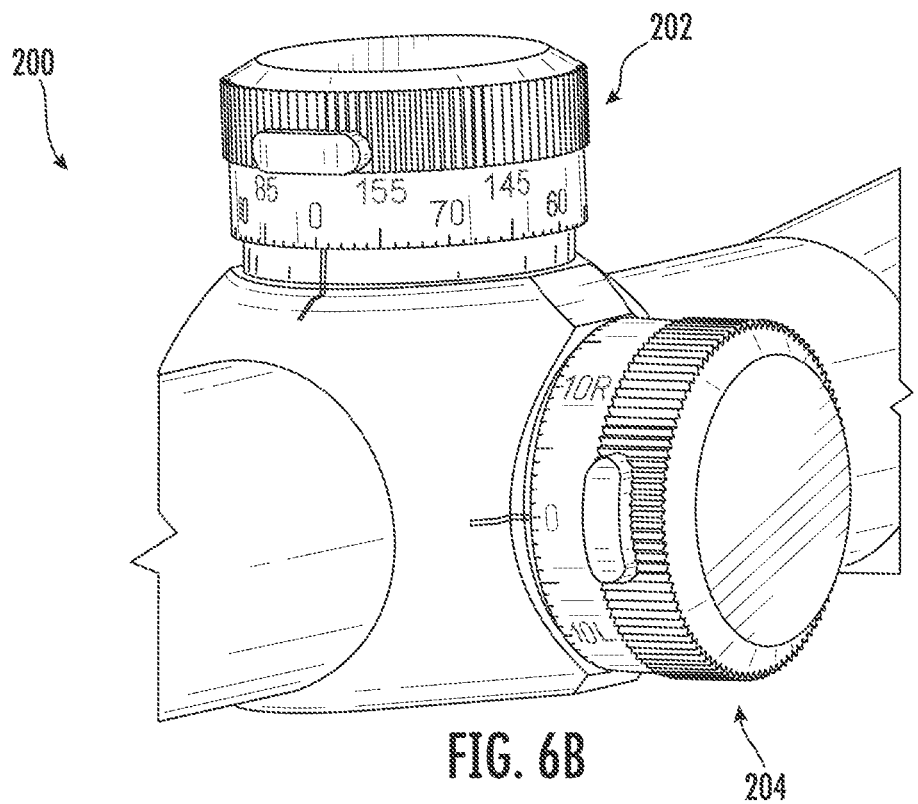

FIG. 6A illustrates a riflescope 200 having adjustment knob 106 used as an elevation knob 202 and a windage knob 204. As shown in FIG. 6A, elevation knob 202 is in an engaged position such that its dial is engaged with a rotating member (112 in FIGS. 1-5) of the elevation knob 202, and windage knob 204 is in a disengaged position such that its dial is disengaged with a rotating member (112 in FIGS. 1-5) of the windage knob 204. A user may have pushed elevation knob 202 toward housing 206 to place elevation knob 202 in its engaged position. In the engaged position, the user may rotate the elevation knob 202 such that optical components of riflescope 200 are adjusted to reflect a particular elevation. The user may then pull elevation knob 202 away from housing 206 to place elevation knob 202 in the disengaged position (as illustrated in FIG. 6B) and then rotate elevation knob 202 until zero mark 208 is aligned with reference mark 210 that is fixed. The user may thereafter push elevation knob 202 back toward housing 206 to place elevation knob 202 in the engaged position, where elevation knob 202 is now zeroed. In FIG. 6A, rotation of windage knob 204 will not cause adjustment of the optical components because windage knob 204 is in a disengaged position. FIG. 6B illustrates an opposite situation to that shown in FIG. 6A where riflescope 200 has elevation knob 202 in a disengaged position and windage knob 204 in an engaged position. When windage knob 204 is in the engaged position illustrated in FIG. 6B, it may be used to adjust optical components of riflescope 200 as discussed above with respect to elevation knob 202 in FIG. 6A.

It will be apparent to those having skill in the art that many changes may be made to the details of the above-described embodiments without departing from the underlying principles of the invention. The scope of the present invention should, therefore, be determined only by the following claims.

The invention claimed is:

1. In an optical aiming device, a user-zeroable adjustment knob, comprising:
   a rotating member rotatable about an axis of rotation to change a setting of the optical aiming device, the rotating member including a rotating member clutch surface centered on the axis of rotation;
   a dial comprising a dial clutch surface, and wherein the dial is movable axially between an engaged position where the dial clutch surface is engaged with the rotating member clutch surface and the dial and the rotating member are rotationally coupled for co-rotation about the axis of rotation, and a disengaged position in which the dial clutch surface is disengaged from the rotating member clutch surface so that the dial is rotatable relative to the rotating member;
   a disengagement groove and an engagement groove formed in one of the rotating member and the dial, the disengagement groove axially spaced apart from the engagement groove; and
   a retainer device carried by the other of the rotating member and the dial for movement along the axis relative to the engagement groove.

2. The optical aiming device of claim 1, wherein the retainer device includes a spring snap ring.

3. The optical aiming device of claim 1, wherein one of the rotating member clutch surface and the dial clutch surface comprises a male spline and the other of the rotating member clutch surface and the dial clutch surface comprises a female spline.

4. The optical aiming device of claim 1, wherein one of the rotating member clutch surface and the dial clutch surface comprises a spline and the other of the rotating member clutch surface and the dial clutch surface comprises a key.

5. The optical aiming device of claim 1, wherein one of the rotating member clutch surface and the dial clutch surface comprises a plurality of splines and the other of the rotating member clutch surface and the dial clutch surface comprises a key.

6. The optical aiming device of claim 1, wherein the dial clutch surface comprises a plurality of male splines arranged circularly around an interior cavity of the dial and the rotating member clutch surface comprises a plurality of female splines arranged circularly around the rotating member.

7. The optical aiming device of claim 1, wherein the rotating member clutch surface and the dial clutch surface each comprise at least one tooth and form a Hirth joint when the dial clutch surface is engaged with the rotating member clutch surface.

8. The optical aiming device of claim 1, wherein the retainer device is substantially housed within a retainer groove when the dial is in the disengaged position.

9. The optical aiming device of claim 1, wherein the retainer device is retracted from a retainer groove when the dial is in the engaged position.

10. The optical aiming device of claim 1, wherein a ridge is formed on the one of the rotating member and the dial having the disengagement groove and the engagement groove.

11. The optical aiming device of claim 10, wherein the ridge is formed between the disengagement groove and the engagement groove.

12. The optical aiming device of claim 11, wherein the ridge is sloped between the disengagement groove and the engagement groove.

13. The optical aiming device of claim 12, wherein the disengagement groove and the engagement groove are both formed in the rotating member, the disengagement groove is formed by a first diameter of the rotating member and the engagement groove is formed by a second diameter of the rotating member, and the first diameter is larger than the second diameter.

14. The optical aiming device of claim 12, wherein the retainer device expands into a retainer groove of the dial when the retainer device rides over the ridge during movement of the retainer device from the engaged position to the disengaged position.

15. The optical aiming device of claim 11, wherein the disengagement groove and the engagement groove are both formed in the rotating member, and wherein the ridge is inclined between about 10 degrees and about 30 degrees relative to the axis of rotation.

16. The optical aiming device of claim 15, wherein a disengagement ridge is formed in the rotating member, and the disengagement ridge is inclined between about 30 degrees and about 60 degrees relative to the axis of rotation.

17. In an optical aiming device, a user-zeroable adjustment knob, comprising:
 a rotating member rotatable about an axis of rotation to change a setting of the optical aiming device, the rotating member including a hub and a rotating member clutch surface centered on the axis of rotation, the hub having a disengagement groove and an engagement groove formed therein and spaced apart;
 a retainer device surrounding a portion of the rotating member, the retainer device moveable between the disengagement groove and the engagement groove;
 a dial comprising a dial clutch surface and a retainer groove, wherein the retainer device is at least partially housed within the retainer groove, and wherein the dial is movable between an engaged position in which the retainer device is seated in the engagement groove and the dial clutch surface is engaged with the rotating member clutch surface, and a disengaged position in which the retainer device is seated in the disengagement groove and the dial clutch surface is disengaged from the rotating member clutch surface.

18. The optical aiming device of claim 17, wherein a ridge is formed on the hub between the disengagement groove and the engagement groove.

19. The optical aiming device of claim 18, wherein the retainer device expands into the retainer groove when the retainer device rides over the ridge during movement of the retainer device from the engagement groove to the disengagement groove.

20. An optical aiming device comprising:
 a tube having an erector system, the erector system including at least one optical component;
 an adjustment knob protruding from the tube and including:
 a rotating member rotatable about an axis of rotation, the rotating member including a hub and a rotating member clutch surface centered on the axis of rotation, wherein the hub includes a disengagement groove and an engagement groove spaced apart;
 a retainer device movable between the disengagement groove and the engagement groove;
 a dial comprising a dial clutch surface, the dial movable between an engaged position where the retainer device is seated in the engagement position and the dial clutch surface is engaged with the rotating member clutch surface, and a disengaged position where the retainer device is seated in the disengagement groove and the dial clutch surface is disengaged from the rotating member clutch surface;
 an adjustment screw coupled to an interior cavity of the rotating member and extending into the tube such that the adjustment screw bears on and is configured to pivotally move the erector system, wherein the adjustment screw is extendable into and retractable out of the tube by rotation of the dial when the dial is in the engaged position; and
 a spring positioned in the tube that presses the erector system against the adjustment screw.

* * * * *